US011908286B2

(12) United States Patent
Van Cleave et al.

(10) Patent No.: US 11,908,286 B2
(45) Date of Patent: *Feb. 20, 2024

(54) COMPUTER-BASED SYSTEM FOR PROVISIONING NEW ACCOUNTS USING LOCATION-BASED AUTHENTICATION

(71) Applicant: Wells Fargo Bank, N.A., San Francisco, CA (US)

(72) Inventors: Shari Van Cleave, San Francisco, CA (US); Darren Michael Goetz, Salinas, CA (US); Dennis Emmanuel Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,121

(22) Filed: Mar. 22, 2023

(65) Prior Publication Data

US 2023/0222879 A1 Jul. 13, 2023

Related U.S. Application Data

(63) Continuation of application No. 17/500,677, filed on Oct. 13, 2021, now Pat. No. 11,625,991, which is a
(Continued)

(51) Int. Cl.
*G07F 19/00* (2006.01)
(52) U.S. Cl.
CPC .......... *G07F 19/204* (2013.01); *G07F 19/203* (2013.01); *G07F 19/206* (2013.01)
(58) Field of Classification Search
CPC ..... G07F 19/204; G07F 19/203; G07F 19/206
(Continued)

(56) References Cited

U.S. PATENT DOCUMENTS 7,866,544 B1 * 1/2011 Block ................... G06Q 20/18
235/379
8,220,707 B1 7/2012 Block et al.
(Continued)

FOREIGN PATENT DOCUMENTS

| CN | 109034996 A | 12/2018 |
|---|---|---|
| KR | 20150074445 A | 7/2015 |
| WO | 2018111858 A1 | 6/2018 |

OTHER PUBLICATIONS

"Incognia Fights Mobile Fraud and Protects Privacy with Location Behavioral Biometrics for Frictionless Authentication and Identity Verification" Incognia, Jun. 2, 2020, 3 pp.
(Continued)

*Primary Examiner* — Daniel A Hess
(74) *Attorney, Agent, or Firm* — Shumaker & Sieffert, P.A.

(57) ABSTRACT

A method comprises receiving, by a computing device from a customer device, a request to provision a financial account for the customer, associating, by the computing device, a mobile device with the requested financial account, and sending, by the computing device to the mobile device, authentication information for the requested financial account. The method further includes receiving the authentication information by the computing device from a financial terminal that received the authentication information from the mobile device, receiving, by the computing device, first location information of the mobile device, and provisioning, by the computing device and based on the first location information of the mobile device being within a predetermined distance of a location of the financial terminal, the requested financial account for the customer.

20 Claims, 4 Drawing Sheets

Related U.S. Application Data continuation of application No. 17/171,819, filed on Feb. 9, 2021, now Pat. No. 11,151,845.

(58) Field of Classification Search
USPC .................................................... 235/379
See application file for complete search history.

(56) References Cited

U.S. PATENT DOCUMENTS

| | | | |
|---|---|---|---|
| 8,295,898 B2 | 10/2012 | Ashfield et al. | |
| 9,355,530 B1 | 5/2016 | Block et al. | |
| 10,475,025 B2 | 11/2019 | Zarakas et al. | |
| 10,607,456 B1 | 3/2020 | Benkreira et al. | |
| 11,151,845 B1 | 10/2021 | Van Cleave et al. | |
| 11,625,991 B1 | 4/2023 | Van Cleave et al. | |
| 2014/0046842 A1* | 2/2014 | Irudayam | G06Q 20/32 235/379 |
| 2015/0186872 A1 | 7/2015 | Sobol et al. | |
| 2015/0310545 A1 | 10/2015 | Deoliveira et al. | |
| 2016/0240050 A1 | 8/2016 | Block et al. | |
| 2018/0268477 A1 | 9/2018 | Adari | |
| 2021/0117969 A1 | 4/2021 | Chilaka et al. | |

OTHER PUBLICATIONS

Prosecution History from U.S. Appl. No. 17/171,819, dated Jun. 23, 2021 through Jun. 23, 2021, 11 pp.

Prosecution History from U.S. Appl. No. 17/500,677, now issued U.S. Pat. No. 11,625,991, dated Aug. 25, 2022, through Dec. 14, 2022, 17 pp.

Van Oorschot et al., "Countering Identity Theft Through Digital Uniqueness, Location Cross-Checking, and Funneling", Financial Cryptography and Data Security, vol. 3570, Feb. 28-Mar. 3, 2005, 13 pp.

* cited by examiner

COMPUTER-BASED SYSTEM FOR PROVISIONING NEW ACCOUNTS USING LOCATION-BASED AUTHENTICATION

CROSS REFERENCE

This application is a continuation of U.S. patent application Ser. No. 17/500,677, filed on Oct. 13, 2021, which is a continuation of U.S. patent application Ser. No. 17/171,819, filed on Feb. 9, 2021, of the entire contents of each of which is incorporated herein by reference.

TECHNICAL FIELD

The disclosure relates to computing devices executing software applications.

BACKGROUND

Provisioning, or "setting up," an account, such as a financial account, is the process of defining the account infrastructure. For example, provisioning an account may include defining authorized users of the account, account identification information, account holdings, e.g., credits, debits, funds and/or an account balance in the case of a financial account, and resources for maintaining and tracking account information, such as electronic resources.

SUMMARY

In general, this disclosure describes a computer-based system for provisioning a new account remotely using location-based authentication. For example, the computer-based system may provide one or more authentication factors to a customer's mobile device for presentation at a financial terminal as a final step to open the remotely-requested new account, in lieu of requiring the customer to be physically present at a branch location of the financial institution provisioning the account. More specifically, the computer-based system may be configured to receive information related to provisioning a financial account initiated by a customer remotely, e.g., via the customer's trusted mobile device. The computer-based system may be configured to receive mobile device information including an expected location of the customer and/or the trusted mobile device associated with the customer. For example, an expected location of the trusted mobile device may be a location relative to location information provided by the customer, such as a home address provided during provisioning of the account, a current location of the customer provided by the customer, location information provided by the customer that is associated with customer travel, and the like.

The computer-based system may further be configured to send authentication information for the remotely-requested new account to the trusted mobile device, and subsequently receive the authentication information for the new financial account from a financial terminal as at least one authentication factor verifying the customer's identity prior to opening the remotely-requested new account. For example, the computer-based system may send the authentication information (e.g., an alphanumeric code, a graphic code, an image, an audio file to be played by a mobile device speaker, and the like) to the trusted mobile device to subsequently be presented by the trusted mobile device to a camera, microphone, or other data receiving device at the financial terminal, such as an automated teller machine (ATM). The financial terminal may have a known location. The computer-based system may be further configured to determine that a location of the trusted mobile device upon receipt of the authentication information is within a predetermined distance of the known location of the financial terminal at which the authentication information was received from the trusted mobile device, and to provision the new account based on the determination. In examples where the trusted mobile device is not within the predetermined distance of the known location of the financial terminal that receives the authentication information, the computer-based system may not provision the account or may send additional information to the customer to authenticate via some other means, such as visiting a branch location.

In one example, this disclosure describes a method comprising receiving, by a computing device from a customer device, a request to provision a financial account for the customer; associating, by the computing device, a mobile device with the requested financial account; sending, by the computing device to the mobile device, authentication information for the requested financial account; receiving, by the computing device from a financial terminal, the authentication information, wherein the financial terminal received the authentication information from the mobile device; receiving, by the computing device, first location information of the mobile device; and based on the first location information of the mobile device being within a predetermined distance of a location of the financial terminal, provisioning, by the computing device, the requested financial account for the customer.

In another example, this disclosure describes a system comprising a memory; and one or more processors in communication with the memory, the one or more processors configured to: receive, from a customer device, a request to provision a financial account for the customer; associate a mobile device with the requested financial account; send, to the mobile device, authentication information for the requested financial account; receive, from a financial terminal, the authentication information, wherein the financial terminal received the authentication information from the mobile device; receive first location information of the mobile device; and based on the first location information of the mobile device being within a predetermined distance of a location of the financial terminal, provision the requested financial account for the customer.

In another example, this disclosure describes a computer readable medium comprising instructions that when executed cause one or more processors to: receive, from a customer device, a request to provision a financial account for the customer; associate the mobile device with the requested financial account; send, to the mobile device, authentication information for the requested financial account; receive, from a financial terminal, the authentication information, wherein the financial terminal received the authentication information from the mobile device; receive location information of the mobile device within a predetermined time from receiving the authentication information; and based on the location information of the mobile device being within a predetermined distance of a location of the financial terminal, provision the requested financial account for the customer.

The details of one or more examples of the disclosure are set forth in the accompanying drawings and the description below. Other features, objects, and advantages of the disclosure will be apparent from the description and drawings, and from the claims.

DETAILED DESCRIPTION

The present disclosure describes a computer-based system for provisioning a new account remotely. The computer-based system may be configured to receive information related to provisioning a financial account initiated by a customer remotely, e.g., from a customer device, associate a mobile device with the requested financial account, send authentication information to the mobile device, subsequently receive the authentication information from the mobile device via a financial terminal, e.g., at a known location, receive location information of the mobile device, e.g., at or near the time of receiving the authentication information via the financial terminal, and provision the new financial account based on the location information of the mobile device being within a predetermined distance of the location of financial terminal, e.g., as an authentication factor verifying the customer's identity.

When a customer signs up and/or applies for a new account remotely, e.g., away from an organization's branch location, verification of the customer may be difficult. In some examples, a network of physical properties, e.g., financial terminals such as ATMs, may be used to allow the customer to complete an extra verification step at a physical property, e.g., as an authentication factor. In some examples, in lieu of in-person authentication at a branch, the customer may bring a mobile computing device, that the customer registered during the application process, to an ATM or a device/financial terminal at a branch and use the device to provide authentication information, such as a code, that was provided to the mobile computing device during the application process. The code and one or more identifiers associated with the mobile computing device may be used as another "know your customer" (KYC) and/or authentication factor.

In the examples provided herein, the computer-based system may provide several benefits. For example, the computer-based system may reduce and/or eliminate the need for the customer to provide authentication during branch operating and/or normal business hours and may reduce the time it takes for a customer to open a new account. The computer-based system may reduce the amount of time the customer needs to interact with a customer service representative which may further reduce an organization's cost and time in provisioning a new account.

Figure 1:
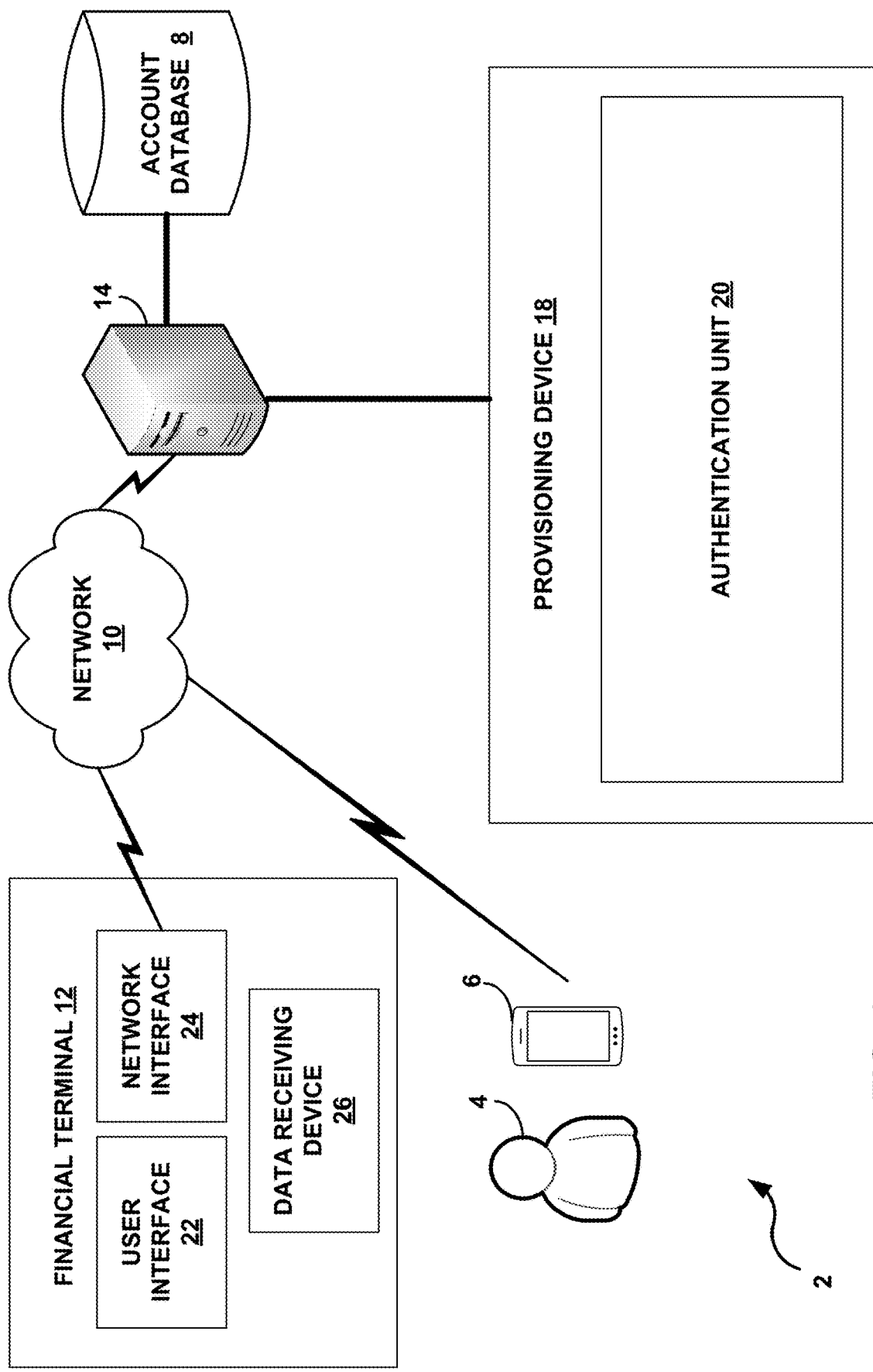
FIG. 1 is a block diagram illustrating an example computer-based system for provisioning a new account remotely using location-based authentication, in accordance with the techniques of this disclosure.

FIG. 1 is a block diagram illustrating an example computer-based system 2 for provisioning a new account remotely using location-based authentication, in accordance with the techniques of this disclosure. As illustrated in FIG. 1, system 2 includes a financial terminal 12 and a host server 14 that may communicate via network 10. Although system 2 is described below as a bank system, system 2 may be associated with any organization or organization type.

In some examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

In some examples, financial terminal 12 may be configured to interact with customer 4 and network 10. For example, financial terminal 12 may be an ATM, and customer 4 may interact with the ATM via user interface 22 presented on a display device of the ATM. The ATM may also include a microphone, a speaker, and a camera, and may be configured to interact with the customer via voice and may be configured to capture images, e.g., of customer 4, mobile device 6, and/or information displayed by mobile device 6. Financial terminal network interface 24 may be configured to send and receive information related to customer 4 interaction with host server 14, via network 10. Financial terminal 12 may also include one or more data receiving devices, e.g., data receiving device 26. Data receiving device 26 may be, or include, one or more of a near-field communication device, an optical scanner and/or bar code or QR code reader, a Bluetooth® device, or any other suitable data receiving device.

Host server 14 may be configured to provision a new financial account for a customer remotely, i.e., without the customer having to be physically present at a branch location of the financial institution provisioning the account, using location-based authentication. For example, host server 14 may provision the remotely-requested new account based on an additional authentication factor received from a trusted mobile device 6 of customer 4 via financial terminal 12 and further based on a location of trusted mobile device 6 in comparison to a location of financial terminal 12 that received the authentication information from mobile device 6, requested account information stored in account database 8, and other information, e.g., information from provisioning device 18, account database 8, or another bank system. Additionally or alternatively, host server 14 may send and receive information with one or more bank systems configured to provision a new account, e.g., provisioning device 18. Although illustrated in FIG. 1 as a single device, in other examples host server 14 may comprise one or more computing devices implemented as any suitable computing system, such as one or more server computers, workstations, mainframes, appliances, cloud computing systems, and/or other computing systems that may be capable of performing operations and/or functions described in accordance with one or more aspects of the present disclosure.

Account database 8 may store account information that may be used to execute a financial transaction or, in the examples described in this disclosure, provision a new financial account for customer 4. In some examples, account database 8 may store requested account information, existing account information, customer 4 profile data, customer 4 behavior data, historical transaction data, and the like. For example, account database 8 may store requested account information such as identification information of at least one account holder, e.g., customer 4, a trusted mobile device, e.g., mobile device 6, of the account holder, authentication information sent to the trusted mobile device for the new account, and any other suitable new account information. In some examples, account database 8 may store existing account information such as an account balance, and account number and routing number, the identification information of one or more account holders, e.g., customer 4, and any other suitable account information. In some examples, account database 8 may store customer 4 behavior data such as dates, times, and locations of one or more financial terminals, e.g., ATMs, that customer 4 has visited and/or performed financial transaction at, customer 4 historical travel information, customer 4 future travel plans, customer 4 web browsing history, and the like. In some examples, account database 8 may store historical transaction data such as, customer 4 purchase and/or shopping history, customer 4 credit/debit history, and the like. In some examples, account database 8 may store customer 4 future travel plans based on travel plans received from customer 4 and/or travel plans inferred and/or determined based on customer 4 web browsing history, purchase/shopping history, credit/debit history, and the like.

In some examples, host server 14 may include and/or be configured to communicate with provisioning device 18. Provisioning device 18 may comprise a computing device configured to execute authentication unit 20. Although illustrated in FIG. 1 as a single device, in other examples provisioning device 18 may comprise one or more computing devices implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, mobile device 6 may be any device capable of communicating via network 10, such as a mobile phone, a smartphone, a laptop computer, a wearable device configured to directly communicate with network 10 or pair with another device such as a smartphone, smart glasses and/or any smart device, and the like.

Provisioning device 18 may be configured to process authentication information and to determine whether to provision a new account for customer 4 based on the authentication information. Provisioning device 18 may also be configured to output further instructions for display on financial terminal 12 after provisioning the new account for customer 4 and/or output instructions for display on financial terminal 12 in lieu of provisioning a new account to customer 4, e.g., further steps for customer 4 to take if authentication succeeds or fails. Provisioning device 18 and to provision the new account and/or provide information to one or more other bank systems for provisioning a new account, e.g., to host server 14 and/or account database 8. Provisioning device 18 may be configured to identify mobile device 6 as being associated with a remotely-requested new financial account to be provisioned, e.g., via authentication unit 20, and request and receive location information of the identified mobile device 6.

Authentication unit 20 may be configured to authenticate customer 4 and/or determine whether authentication succeeds or fails. In some examples, authentication unit 20 is configured to authenticate customer 4, and/or to authenticate that a request by customer 4 to remotely provision a new account is legitimate and not fraudulent, via one or more location-based authentication factors. For example, authentication unit 20 may be configured to authenticate customer 4 and/or the new account request based on location-based authentication factors determined at one or more times in lieu of requiring customer 4 to be physically present at a branch location. As one example, authentication unit 20 may compare expected locations of customer 4 with determined locations of mobile device 6 and compare a known location of financial terminal 12 with determined locations of mobile device 6 at one or more stages of the remotely-requested account provisioning process.

In some examples, authentication unit 20 may be configured to determine location-based authentication factors via mobile device 6 of customer 4. For example, authentication unit 20 may associate mobile device 6 with the requested new account and/or customer 4 in response to the new account request. In some examples, authentication unit 20 may associate mobile device 6, as a trusted mobile device of customer 4, with the remotely-requested new account based on information provided by customer 4 or based on known information of customer 4, e.g., trusted mobile device information stored in account database 8.

For example, customer 4 may remotely request a new account via an online banking platform supported by host server 14 and other computing devices of a bank network for the financial institution provisioning the new account. Customer 4 may log in to the online banking platform via mobile device 6 or another customer computing device, such as a desktop or laptop computer, executing a browser, an application, or other software capable of supporting user access to the online banking platform. In order to log in and remotely request a new account, customer 4 may first enter authentication credentials, e.g., username, password, personal identification number, biometric data, or the like, via one or more input devices of mobile device 4 or the other computing device.

Upon receipt of the request for the new account, authentication unit 20 may verify that mobile device 6, as a trusted mobile device of customer 4, is within a predetermined distance (e.g., 1 meter, 10 meters, 1 kilometer, or the like), from customer 4 by determining and comparing the location of mobile device 6 and an expected location of customer 4 at or near the time of the new account request. Authentication unit 20 may verify that mobile device 6 is within the predetermined distance from customer 4 possession based on the location of mobile device 6 being within a predetermined distance from the expected location of customer 4 at or near the time of the new account request. Once the location of mobile device 6 is verified as being near customer 4, provisioning device 18 sends authentication information, e.g., a code, for the remotely-requested new financial account to mobile device 6. In some examples, "at or near the time of the new account request" may be within seconds, within minutes, within hours, within a day, within a week, or within a predetermined time period from the time at which the new account request is received, e.g., by host server 14. For example, authentication unit 20 may allow for a predetermined amount of time to pass between the time at which host server 14 receives the new account request and the time at which the location of mobile device 6 is sent to allow customer 4 to respond to a location request, e.g., a push notification, and any communication delay.

In general, it is expected that mobile device 6 of customer 4 would be relatively near customer 4 most of the time, e.g., within a same room or same building, as customer 4. As such, verifying that mobile device 6 is in fact near customer 4 at or near the time of the new account request may be used as an additional authentication factor for customer 4 prior to provisioning the remotely-requested new account. If mobile device 6 is not near the expected location of customer 4, e.g., within the predetermined distance, at or near the time of the new account request, there may be an increased risk that mobile device 6 has been lost or stolen and is longer a trusted mobile device of customer 4 or that the remote request to provision a new account for customer 4 is fraudulent.

Prior to actually provisioning the remotely-requested new account, authentication unit 20 is configured to authenticate customer 4 and/or the new account request based on further authentication steps and/or factors so as to reduce the risk of the new account request being fraudulent. For example, in lieu of requiring customer 4 to be physically present at a branch office in order to verify the identity of customer 4 and legitimacy of the new account request, the disclosed techniques may include completion of additional authentication steps at a financial terminal, e.g., financial terminal 12, to verify the identity of customer 4 and the legitimacy of the remote request for the new account. The additional authentication steps may include customer 4 being physically present at financial terminal 12, which may be more convenient than a branch office as financial terminal 12, e.g., an ATM, may not be constrained to normal business hours and availability of a customer service representative.

In some examples, as the final step to open the remotely-requested new account, authentication unit 20 may receive the authentication information, e.g., the code, for the remotely-requested new financial account from mobile device 6 via financial terminal 12. In some examples, financial terminal 12 may capture an image and/or audio information of customer 4 and/or the authentication information presented on mobile device 6 via a camera and/or microphone of financial terminal 12. In addition, authentication until 20 may determine a location of mobile device 6 at or near the time at which the authentication information is received from mobile device 6 and compare the determined location of mobile device 6 to a known location of financial terminal 12. In some examples, authentication unit 20 may be configured to determine a decreased risk of the new account request being fraudulent based on correlating the known location of financial terminal 12 to an expected location of customer 4, e.g., near the home of customer 4 or a location correlated with known travel plans of customer 4.

As described above, authentication unit 20 may be configured to send authentication information to mobile device 6, e.g., after successful verification of the location of mobile device 6 as the trusted mobile device of customer 4 and association of mobile device 6 with the new account request. Customer 4 may then be instructed to bring mobile device 6 to a financial terminal 12 and present the authentication information to financial terminal 12 to complete the new account request. In some examples, the authentication information may include an alphanumeric code, a graphic code, an image, an audio file to be played by a speaker of mobile device 6, and the like, which may be presented to a camera or microphone, a data receiving device, or otherwise entered, at financial terminal 12.

In some examples, and in order to determine that customer 4 and/or mobile device 6 are actually present at financial terminal 12 at or near the time at which the authentication information is provided to financial terminal 12, authentication unit 20 may be configured to determine a location of mobile device 6 at or near the time the authentication information is provided to financial terminal 12. For example, authentication unit 20 may be configured to determine that mobile device 6 is located within a predetermined distance from a location of financial terminal 12 at or near the time financial terminal 12 receives the authentication information from mobile device 6, e.g., at a time subsequent to the time at which customer 4 requests provisioning of the new account.

Authentication unit 20 may be configured to receive the time at which financial terminal 12 received the authentication information, e.g., financial terminal 12 may be configured to add a timestamp indicating the time the authentication information was provided to financial terminal 12 and to send the authentication information and the timestamp to provisioning device 18. In some examples, authentication unit 20 may be configured to receive information from mobile device 6 confirming that authentication information was provided to financial terminal 12, e.g., a timestamp from mobile device 6 corresponding to the time at which the authentication information was provided to financial terminal 12.

In some examples, authentication unit 20 may determine a risk score based on the one or more location-based authentication factors, e.g., the location of the mobile device 6 at or near the time the authentication information is received by financial terminal 12. For example, authentication unit 20 may be configured to determine a risk score based on whether the location of mobile device 6 is within a predetermined distance from the location of the financial terminal 12 that received authentication information from mobile device 6. In some examples, "at or near the time the information is received by financial terminal 12" may be within seconds, within minutes, within hours, within a day, within a week, or within a predetermined time period from a time at which financial terminal 12 has determined that the authentication information was received. For example, authentication unit 20 may allow for a predetermined amount of time to pass between the time at which financial terminal 12 receives the authentication information and the time at which the location of mobile device 6 is sent to allow customer 4 to respond to a location request, e.g., a push notification, and any communication delay.

In some examples, authentication unit 20 may be configured to determine a risk score based on alternative and/or additional information. For example, authentication unit 20 may be configured to determine a risk score based on the distance of the location of mobile device 6 from financial terminal 12, customer 4 past history and transaction behavior, known customer 4 travel plans, an image of customer 4 captured via one or both of financial terminal 12 and mobile device 6 at or near the time that financial terminal 12 receives the authentication information from mobile device 6, and the like. In some examples, the risk score may represent the risk of the new account request being fraudulent, and provisioning device 18 may provision a new account based on the risk score. For example, provisioning device 18 may provision a new account based on the risk score being less than a threshold value, and may not provision a new account and/or send further instructions to mobile device 6 based on the risk score being greater than or equal to the threshold value.

Figure 2:
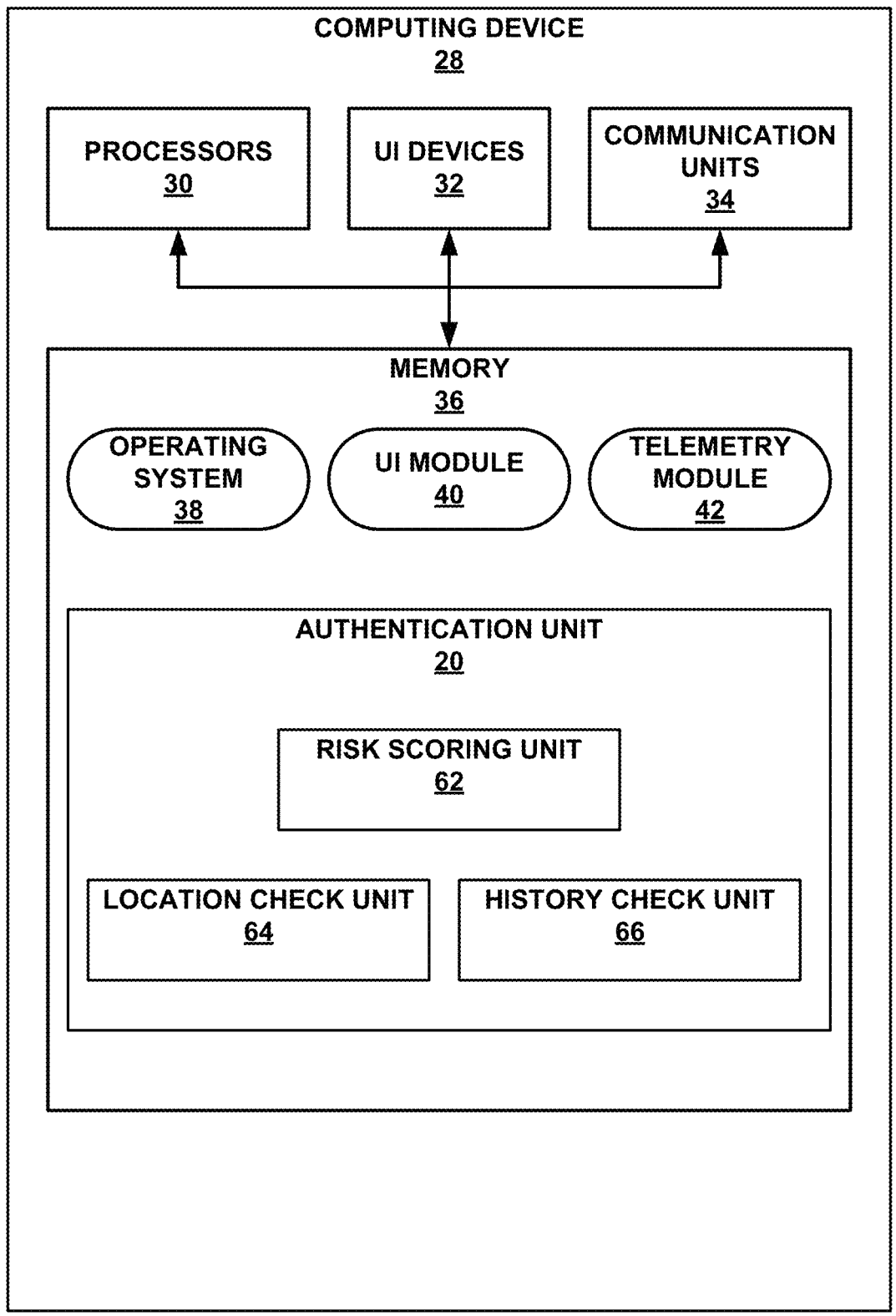
FIG. 2 is a block diagram illustrating an example computing device configured to provision a new account remotely using location-based authentication, in accordance with the techniques of this disclosure.

FIG. 2 is a block diagram illustrating an example computing device 28 configured to provision a new account, in accordance with the techniques of this disclosure. Computing device 28 may be an example of host server 14 of FIG. 1 or provisioning device 18 of FIG. 1, which may be included within or in communication with host server 14. The architecture of computing device 28 illustrated in FIG. 2 is shown for exemplary purposes only and computing device 28 should not be limited to this architecture. In other examples, computing device 28 may be configured in a variety of ways.

As shown in the example of FIG. 2, computing device 28 includes one or more processors 30, one or more user interface (UI) devices 32, one or more communication units 34, and one or more memory units 36. Memory 36 of computing device 28 includes operating system 38, UI module 40, telemetry module 42, and authentication unit 20, which are executable by processors 30. Each of the components, units or modules of computing device 28 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., authentication unit 20) to temporarily store information during program execution.

Computing device 28 may utilize communication units 34 to communicate with external devices via one or more networks, e.g., network 10 from FIG. 1, or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as electronic transaction operator device 12, mobile device 6, and account database 8 from FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and authentication unit 20 with processors 30, UI devices 32, communication units 34, and memory 36. UI module 40, telemetry module 42, and authentication unit 20 may each include program instructions and/or data stored in memory 36 that are executable by processors 30. For example, authentication unit 20 may include instructions that cause computing device 28 to perform one or more of the techniques described in this disclosure.

Computing device 28 may include additional components that, for clarity, are not shown in FIG. 2. For example, computing device 28 may include a battery to provide power to the components of computing device 28. Similarly, the components of computing device 28 shown in FIG. 2 may not be necessary in every example of computing device 28.

In the example illustrated in FIG. 2, authentication unit 20 includes risk scoring unit 62, location check unit 64, and history check unit 68. In some examples, authentication unit 20 may be configured to determine a risk that a request to provision and/or set up a new account may be fraudulent, e.g., based on information from location check unit 64, history check unit 66, and/or risk scoring unit 62 and/or a risk score. Authentication unit 20 may be configured to provision a new account or output further steps required before provisioning a new account based on the determined risk score.

For example, customer 4 may log into an online account of the organization using their login credentials (e.g., for an existing customer) or register/sign-up for an online account with the organization (e.g., for a new customer) using a computing device. In some examples, customer 4 may request a new financial account using mobile device 6, but in general, customer 4 may request a new financial account using any computing device, or by requesting a new account via a telephone call with a customer service representative, or by any other suitable method for requesting a new financial account. In the example of an online new financial account request, customer 4 may select one or more new account options. Authentication unit 20 may associate mobile device 6 with the new account request based on information from location check unit 64, history check unit 66, and/or risk scoring unit 62.

Risk scoring unit 62 may be configured to determine a risk score based on a failed or successful authentication and other information. Risk scoring unit 62 may determine a risk score based on predetermined criteria and/or information related to customer 4 and/or mobile device 6. For example, risk scoring unit 62 may determine a risk score based on information determined by location check unit 64 and/or history check unit 66.

In some examples, location check unit 64 may be configured to independently identify and/or confirm the identity of customer 4 and/or association of mobile device 6 with customer 4 and/or the requested new financial account. For example, location check unit 64 may be configured to determine an expected location of customer 4, e.g., within a predetermined time from a time at which customer 4 requested the new financial account. In some examples, location check unit 64 may determine the expected location of customer 4 based on information provided by customer 4, e.g., a home address and/or a current location. In some examples, location check unit 64 may determine the expected location of customer 4 based on travel plans and/or any other suitable information, e.g., information from history check unit 66.

In some examples, history check unit 66 may be configured to determine an expected location of customer 4 based on the past history of customer 4. For example, history check unit 66 may determine the expected customer 4 location based on location history of customer 4, e.g., an existing customer. Customer 4 may "opt in" and/or allow authentication unit 20 to request and/or receive location information of a mobile device of customer 4, e.g., mobile device 6, and history check unit 66 may then build a location history of mobile device 6 and may determine an expected location of customer 4 based on the location history of mobile device 6.

In some examples, history check unit 66 may be configured to determine certain behaviors and inferred intent of customer 4. Risk scoring unit 62 may determine a reduced and/or increased risk of a fraudulent new account request based on the behaviors and inferred intent. For example, history check unit 66 may be configured to determine travel plans of customer 4, for which it would be expected that mobile device 6 of customer 4 would be in a location different than a home address. In some examples, customer 4 may provide information related to travel plans to the organization or bank operating computing device 28. History check unit 66 may access the travel plans and determine that customer 4 is expected to be traveling. In some examples, history check unit 66 may infer travel plans of customer 4. For example, history check unit 66 may be configured to access shopping/purchase information for customer 4, e.g., customer 4 may "opt in" to sharing such information. Additionally and/or alternatively, history check unit 66 may be configured to access browsing and/or search activity of customer 4. History check unit 66 may be configured to determine that the shopping/purchasing/browsing/searching of customer 4 is associated with upcoming travel. For example, history check unit 66 may be configured to execute one or more machine learning, artificial intelligence, or other technique to infer customer 4 intent based on customer 4 shopping/purchasing/browsing/searching information, such as the intent to travel. In some examples, authentication unit 20 may be configured to provision an account based at least partially on the known or inferred travel plans, or lack thereof, and risk scoring unit 62 may be configured to decrease (or increase) the risk score based on the known or inferred travel plans (or lack thereof).

Location check unit 64 may further be configured to determine the location of mobile device 6 within a predetermined amount of time from the time at which customer 4 requested the new financial account, and to compare the location of mobile device 6 to the expected location of customer 4. In some examples, authentication unit 20 may associate and/or confirm association of mobile device 6 with customer 4 and/or the new requested financial account based on the location of mobile device 6 being within a predetermined distance from the expected location of customer 4. For example, authentication unit 20 may send a push notification to mobile device 6 in response to customer 4 requesting the new account and providing mobile device identification information (e.g., such as a mobile device phone number). Authentication unit 20 may receive location information from mobile device 6 in response to customer 4 confirming, via the push notification, to send the location information. In some examples, risk scoring unit 62 may lower a risk score, e.g., meaning the risk of the new account request being fraudulent is less, if the location of mobile device 6 is within a predetermined distance from the expected location of customer 4. Authentication unit 20 may verify that mobile device 6 is the trusted mobile device and complete association of mobile device 6 with the requested new account and/or customer 4 based on a first location-based authentication factor, e.g., the location of mobile device 6 being within a predetermined distance from the expected location of customer 4 at or near the time of the new account request.

Authentication unit 20 may be configured to authenticate the new account request and/or customer 4 based on a second, subsequent, location-based authentication factor. For example, authentication unit 20 may be configured to send authentication information to mobile device 6 to be used as part of a second location-based authentication factor, e.g., requiring customer 4 and/or mobile device 6 to be physically present at financial terminal 12. Authentication unit 20 may further be configured to receive the authentication information at the second, subsequent time, from financial terminal 12, and to verify that mobile device 6 was actually present at financial terminal 12 at or near the time that financial terminal 12 received the authentication information. The authentication information may include an alphanumeric code, a graphic code, an image, an audio file to be played by a speaker of mobile device 6, and the like, which may be presented to a camera or microphone, a data receiving device, or otherwise entered, at financial terminal 12.

In some examples, location check unit 64 may be configured to determine a location of mobile device 6 within a predetermined time from a time at which financial terminal 12 receives the authentication information that was provided to mobile device 6. For example, customer 4 and/or mobile device 6 may provide the authentication information to financial terminal 12, and authentication unit 20 may receive the authentication information from financial terminal 12. Location check unit 64 may be configured to send a push notification to mobile device 6 in response to authentication unit 20 receiving the authentication information. Location check unit 64 may receive location information from mobile device 6 within a predetermined amount of time from the time at which financial terminal 12 received the authentication information, e.g., location information sent from mobile device 6 to computing device 28 in response to customer 4 confirming, via the push notification, to send the location information. Location check unit 64 may further be configured to determine a location of financial terminal 12, e.g., an ATM at which the authentication information is received, and to compare the location of financial terminal 12 and the received location information of mobile device 6. In some examples, risk scoring unit 62 may lower a risk score, e.g., meaning the transaction is less risky, if the location of financial terminal 12 is within a predetermined distance from the expected location of mobile device 6, e.g., within the predetermined amount of time from the time at which the authentication information was received by financial terminal 12.

Figure 3:
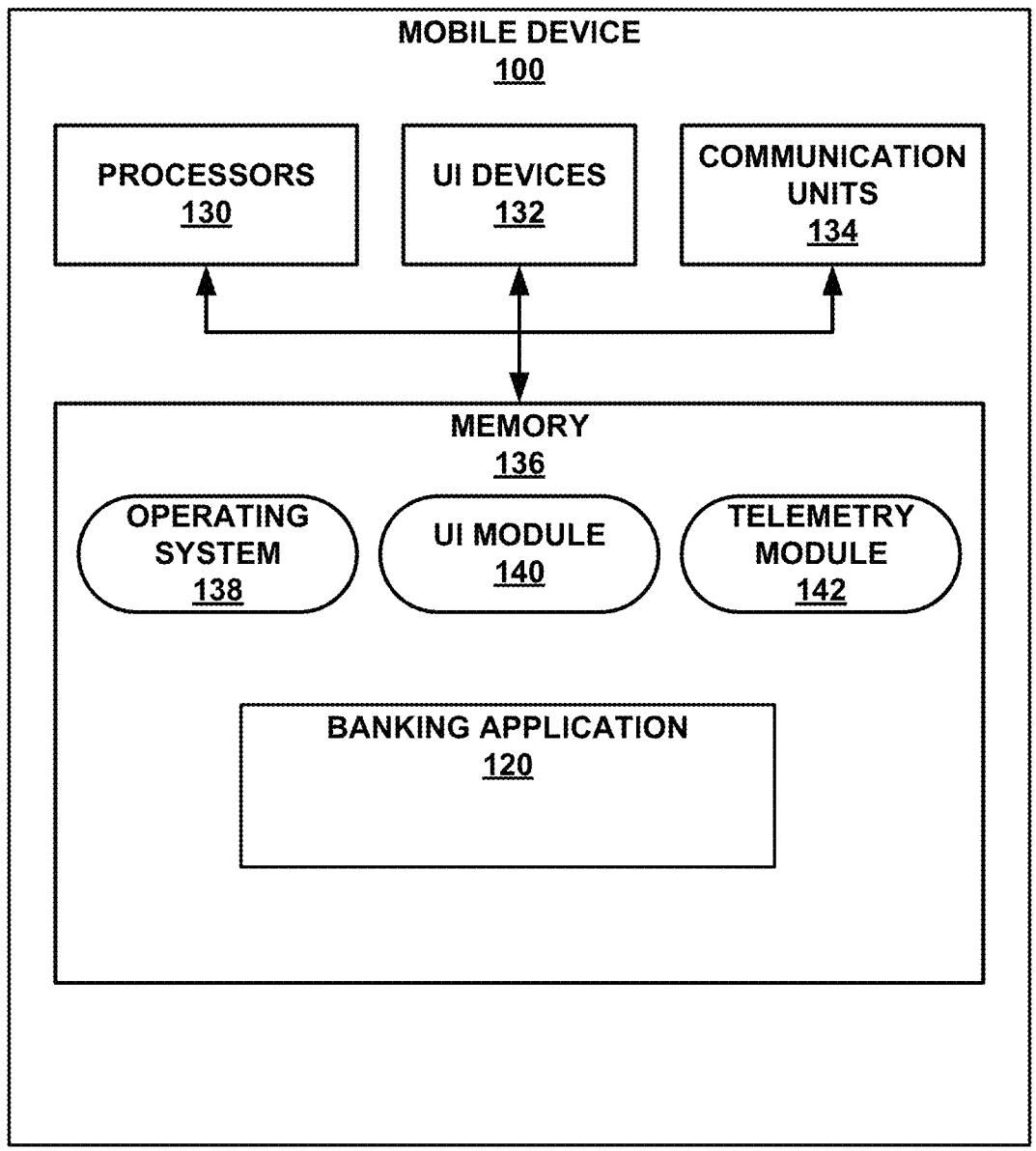
FIG. 3 illustrates a block diagram illustrating an example mobile device, in accordance with the techniques of this disclosure.

FIG. 3 is a block diagram illustrating an example mobile device 100, in accordance with the techniques of this disclosure. Mobile device 100 may be an example of mobile device 6 of FIG. 1, which may be in communication with server 14. The architecture of mobile device 100 illustrated in FIG. 3 is shown for exemplary purposes only and mobile device 100 should not be limited to this architecture. In other examples, mobile device 100 may be configured in a variety of ways.

As shown in the example of FIG. 3, mobile device 100 includes one or more processors 130, one or more UI devices 132, one or more communication units 134, and one or more memory units 136. Memory 136 of mobile device 100 includes operating system 138, UI module 140, telemetry module 142, and banking application 120, which are executable by processors 130. Each of the components, units or modules of mobile device 100 are coupled (physically, communicatively, and/or operatively) using communication channels for inter-component communications. In some examples, the communication channels may include a system bus, a network connection, an inter-process communication data structure, or any other method for communicating data.

Processors 130, in one example, may comprise one or more processors that are configured to implement functionality and/or process instructions for execution within mobile device 100. For example, processors 130 may be capable of processing instructions stored by memory 136. Processors 130 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 136 may be configured to store information within mobile device 100 during operation. Memory 136 may include a computer-readable storage medium or computer-readable storage device. In some examples, memory 136 include one or more of a short-term memory or a long-term memory. Memory 136 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 136 is used to store program instructions for execution by processors 130. Memory 136 may be used by software or applications running on mobile device 100 (e.g., banking application 120) to temporarily store information during program execution.

Mobile device 100 may utilize communication units 134 to communicate with external devices via one or more networks, e.g., network 10 from FIG. 1, or via wireless signals. Communication units 134 may be network interfaces, such as Ethernet interfaces, optical transceivers, radio frequency (RF) transceivers, or any other type of devices that can send and receive information. Other examples of interfaces may include Wi-Fi, NFC, or Bluetooth® radios. In some examples, mobile device 100 utilizes communication units 134 to wirelessly communicate with an external device, such as electronic transaction operator device 12 of FIG. 1.

UI devices 132 may be configured to operate as both input devices and output devices. For example, UI devices 132 may be configured to receive tactile, audio, or visual input from a user of mobile device 100. In addition to receiving input from a user, UI devices 132 may be configured to provide output to a user using tactile, audio, or video stimuli. In one example, UI devices 132 may be configured to output content such as a GUI for display at a display device. UI devices 132 may include a presence-sensitive display that displays a GUI and receives input from a user using capacitive, inductive, and/or optical detection at or near the presence sensitive display.

Other examples of UI devices 132 include a touchscreen, mouse/touchpad/trackball, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 132 include a speaker, a cathode ray tube (CRT) monitor, a liquid crystal display (LCD), organic light emitting diode (OLED), or any other type of device that can generate intelligible output to a user.

Operating system 138 controls the operation of components of mobile device 100. For example, operating system 138, in one example, facilitates the communication of UI module 140, telemetry module 142, and banking application 120 with processors 130, UI devices 132, communication units 134, and memory 136. UI module 140, telemetry module 142, and banking application 120 may each include program instructions and/or data stored in memory 136 that are executable by processors 130. For example, banking application 120 may include instructions that cause mobile device 100 to perform one or more of the techniques described in this disclosure.

Mobile device 100 may include additional components that, for clarity, are not shown in FIG. 3. For example, mobile device 100 may include a battery to provide power to the components of mobile device 100. Similarly, the components of mobile device 100 shown in FIG. 3 may not be necessary in every example of mobile device 100.

Banking application 120 may be configured to send or output location information, such as GPS coordinates, to computing device 28 and to receive authentication information from computing device 28. Banking application 120 may also be configured to exchange information with financial terminal 12, e.g., authentication information received from computing device 28. For example, banking application 120 may be configured to provide the location information, and receive and exchange the authentication information, as part of one or more location-based authentication factors used to authenticate customer 4 and/or a new account request as described above.

In some examples, banking application 120 may be configured to send and receive push notifications, e.g., with computing device 28 via network 10, for actively sending location information of mobile device 100. Banking application 120 may be configured to present selection options to, and to receive selections from, customer 4. For example, banking application 120 may be configured to present options to customer 4 for a one-time option to share location information valid for a period of time or until revoked, or to present options to customer 4 for sharing location information on a case-by-case basis, and to receive selected options from customer 4.

In some examples, banking application 120 may be configured to prompt customer 4 to allow financial terminal 12 and mobile device 100 to communicate via one or more short-range communication techniques, e.g., a ping request via a short-range communication technique. In some examples, banking application 120 may be configured to acquire an image and output the image to computing device 28, as described above. In some examples, banking application 120 may be configured process the image to identify/recognize customer 4 and to send the image processing results to computing device 28 with, or in lieu of, the image.

In some examples, in response to customer 4 remotely-requesting a new account using mobile device 100 or some other means, as described above, banking application 120 may be configured to receive authentication information for the new account from the bank network and to subsequently provide the authentication information to a financial terminal as the final step to open the remotely-requested new account. For example, banking application 120 may be configured to receive authentication information from computing device 28, and to provide the received authentication information to another device, e.g., financial terminal 12, as part of satisfying one or more location-based authentication factors. In some examples, banking application 120 may be configured to send authentication information via remote communications, e.g., a short-range communication technique such as NFC or Bluetooth.® In some examples, banking application 120 may be configured to cause mobile device 100 to display the authentication information or audibly output the authentication information, e.g., via a speaker.

In some examples, banking application 120 may be configured to receive and/or provide an authentication challenge and a customer response and/or answer to the authentication challenge. For example, banking application 120 may be configured to receive an authentication challenge from computing device 28, display and/or otherwise output the authentication challenge (e.g., audibly output the challenge via a speaker), and receive customer 4 input in response and/or answer to the challenge. Banking application 120 may be configured to output the customer response to financial terminal 12 and/or computing device 28.

In some examples, banking application 120 may be configured to receive and/or provide instructions for authenticating the new financial account request. For examples, banking application 120 may be configured to receive authentication instructions from computing device 28, display and/or otherwise output the authentication instructions (e.g., audibly output the challenge via a speaker), and receive customer 4 input in response to the authentication instructions. For example, banking application 120 may receive instructions directing customer 4 to take mobile device 6 to a branch location in order to authenticate the new financial account request and may display other information that customer 4 should be prepared to provide at the branch location, and banking application 120 may provide directions to, or the location of, a branch location.

Figure 4:
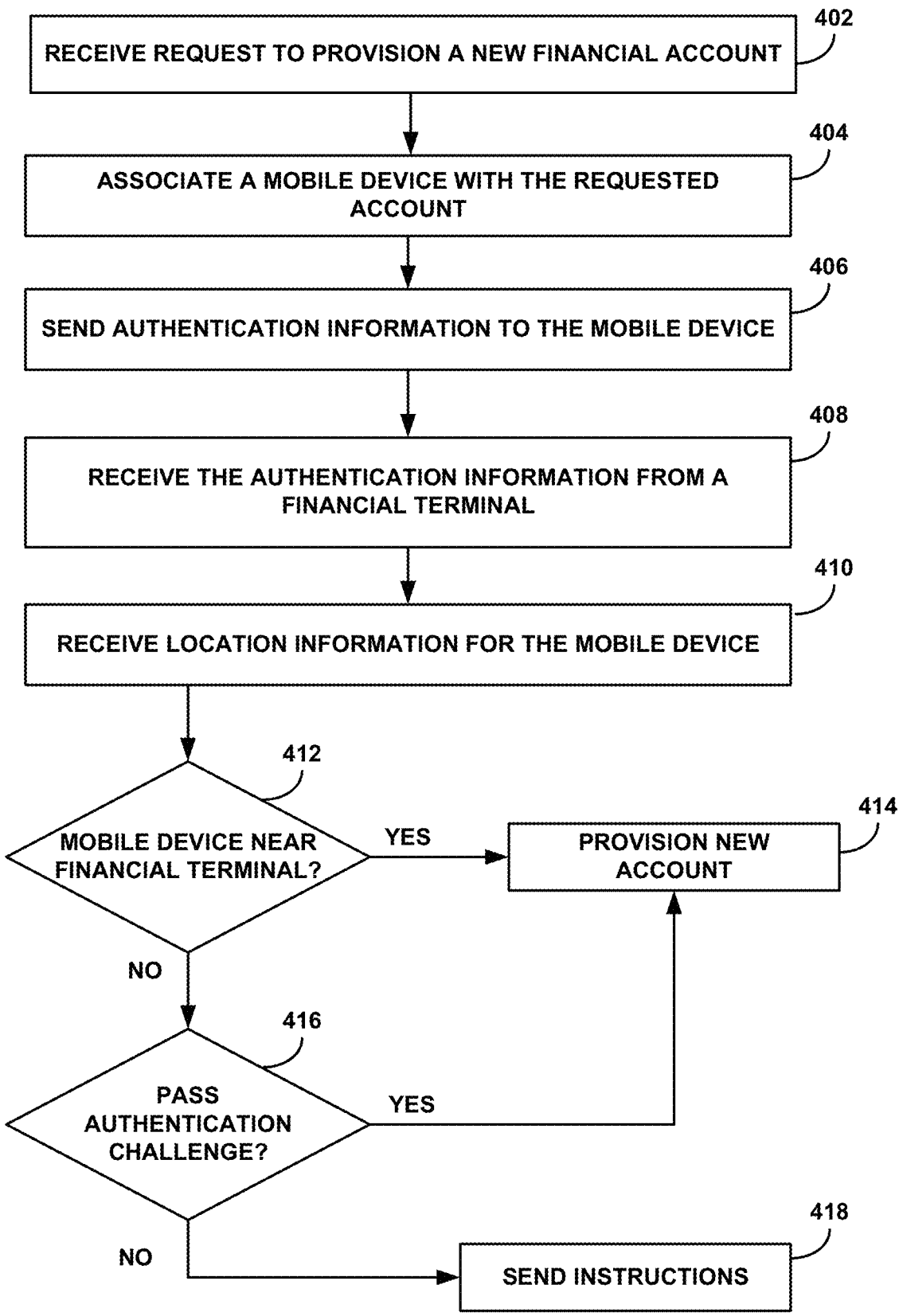
FIG. 4 is a flowchart illustrating an example method of provisioning a new account remotely using location-based authentication, in accordance with the techniques of this disclosure.

FIG. 4 is a flowchart illustrating an example method 400 of provisioning a new account remotely using location-based authentication, in accordance with the techniques of this disclosure. Although FIG. 4 is discussed using computer-based system 2 of FIG. 1, computing device 28 of FIG. 2, and mobile device 100 of FIG. 3, it is to be understood that the methods discussed herein may include and/or utilize other systems and methods in other examples.

Computing device 28 may receive a request to provision a new financial account (402). For example, customer 4 may request a new financial account using a user device in communication with host server 14, and provisioning device 18 may receive the request.

Computing device 28 may associate a mobile device with the requested financial account (404). For example, customer 4 may provide identification information of mobile device 6, e.g., during the process of requesting the new financial account. Customer 4 may select an application option that may send mobile device 6 identification information to computing device 28, e.g., an international mobile equipment identity (IMEI), a mobile equipment identifier (MEID), an electronic serial number (ESN), an international mobile subscriber identity (IMSI), a media access control (MAC) address, and the like. In some examples, customer 4 may provide a phone number associated with mobile device 6.

In some examples, computing device 28 may associate and/or verify an association of mobile device 6 with the requested new financial account and/or customer 4 based on a comparison of the mobile device 6 location and an expected customer 4 location. For example, computing device 28 may determine an expected location of customer 4 based on customer 4 travel plans, customer 4 location history, mobile device 6 location history, a credit and/or debit card usage history of customer 4, an internet browsing history of customer 4, a financial terminal use history of customer 4, customer 4 provided information, customer 4 historical information, customer 4 past and/or predicted behavioral information, or any other suitable information, e.g., as described above with reference to location check unit 64 and history check unit 66, at or near the time at which customer 4 requests provisioning of the new financial account. Computing device 28 may receive location information of mobile device 6 within a predetermined amount of time from the time at which customer 4 requests provisioning of the new financial account. In some examples, computing device 28 may send a request for mobile device 6 to send the location information of mobile device 6 to computing device 28 and computing device 28 may receive the location information in response to the request for the mobile device 6 to send the location information. In some examples, the request for mobile device 6 to send location information may comprise a push notification, and computing device 28 may receive the location information from mobile device 6 in response to customer 4 indicating to send the location information, e.g., via a selection included in the push notification. Computing device 28 associate and/or verify the association of mobile device 6 based with the requested financial account and/or customer 4 based on the location of mobile device 6 being within a predetermined distance from the expected location of customer 4.

Computing device 28 may send authentication information for the requested financial account to mobile device 6 (406). For example, computing device 28 may send a QR code, a barcode, an alphanumeric code, a graphic code, an image, an audio file to be played by mobile device 6, mobile device identification information, or any other suitable authentication information.

Computing device 28 may receive the authentication information from financial terminal 12 (408). For example, an financial terminal 12 may receive the authentication information from customer 4 via input, e.g., via a keypad, audio capture of customer 4 speaking by a microphone of financial terminal 12, or customer 4 presenting the information to a camera of financial terminal 12. In some examples, customer 4 may present the display of mobile device 6 for financial terminal 12 to read an alphanumeric code, a QR code, a barcode, an image, and the like, via a camera of financial terminal 12. In some examples, mobile device 6 may directly send the authentication information to financial terminal 12, e.g., via NFC, Bluetooth®, or any other suitable short-range communication means. In some examples, financial terminal 12 may be an ATM.

Computing device 28 may receive location information for the mobile device (410). For example, computing device 28 may send a push notification to mobile device 6 in response to receiving the authentication information. Computing device 28 may then receive mobile device 6 location from mobile device 6 in response to the request, e.g., via customer 4 indicating to send the location information via a selection included in the push notification. For example, computing device 28 may receive location information from mobile device 6 within a predetermined amount of time from the time at which financial terminal 12 received the authentication information, e.g., location information that mobile device 6 sent in response to customer 4 confirming, via the push notification, to send the location information.

Computing device 28 may determine whether the mobile device is near, e.g., within a predetermined distance from the financial terminal (412). For example, computing device 28 may determine a location of financial terminal 12, e.g., an ATM at which the authentication information is received, and to compare the location of financial terminal 12 and the received location information of mobile device 6, e.g., as an authentication factor and/or a factor which may adjust an amount of risk or a risk score of the request to provision the new financial account being fraudulent. In some examples, computing device 28 may determine a risk score, e.g., a risk score of a fraudulent financial account provisioning request, based on the received location information. For example, computing device 28 may lower a risk score, e.g., meaning the transaction is less risky, if the location of financial terminal 12 is within a predetermined distance from the location of mobile device 6, e.g., within the predetermined amount of time from the time at which the authentication information was received by financial terminal 12. In some examples, computing device 28 may determine and/or adjust a risk score based on the distance between financial terminal 12 and the received location information of mobile device 6, e.g., received within the predetermined time from the time at which financial terminal 12 received the authentication information.

If mobile device 6 is located within the predetermined distance from financial terminal 12, e.g., based on the mobile device location information received within the predetermined amount of time from the time at which financial terminal 12 received the authentication information (the YES branch of 412), computing device 28 may provision the new account (414). If mobile device 6 is not located within the predetermined distance from financial terminal 12 (the NO branch of 412), computing device 28 may send an authentication challenge and/or information indicative of an authentication challenge, to financial terminal 12 and/or computing device 6 for customer 4 to respond to and/or answer and determine whether the challenge is passed based on the response and/or answer of customer 4 (416). For example, customer 4 may provide input via keypad, voice, or other input to either financial terminal 12 and/or mobile device 6 in response and/or answer to the authentication challenge, which computing device 28 may receive from financial terminal 12 and/or mobile device 6.

If computing device 28 determines that the response and/or answer provided by customer 4 passes the authentication challenge (the YES branch of 416), computing device 28 may provision the new account (414). If computing device 28 determines that the response and/or answer provided by customer 4 does not pass the authentication challenge (the NO branch of 416), computing device 28 may send instructions for authenticating the financial account request to financial terminal 12 and/or mobile device 6 (418). For example, computing device 28 may send instructions directing customer 4 to take mobile device 6 to a branch location in order to authenticate the new financial account request and may display other information that customer 4 should be prepared to provide at the branch location, and computing device 28 may provide directions to, or the location of, a branch location.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a computing device from a customer device, a request to provision a financial account for a customer;
   verifying, by the computing device, a first location of a mobile device of the customer associated with the requested financial account being within a predetermined distance of an expected location of the customer;
   receiving, by the computing device from a financial terminal, authentication information, wherein the financial terminal received the authentication information from the mobile device;
   based on a second location of the mobile device not being within a predetermined distance of a location of the financial terminal, sending, from the computing device to the financial terminal or the mobile device, information indicative of an authentication challenge; and
   provisioning, by the computing device, the financial account based on a customer answer passing the authentication challenge.

2. The method of claim 1, further comprising:
   associating, by the computing device, the mobile device with the requested financial account,
   wherein associating the mobile device with the requested financial account is based on the first location of the mobile device being within the predetermined distance of the expected location of the customer.

3. The method of claim 1, wherein the computing device receives the first location of the mobile device within a first predetermined time from receiving the request to provision the financial account, and wherein the computing device receives the second location of the mobile device within a second predetermined time from receiving the authentication information from the financial terminal.

4. The method of claim 1, wherein the expected location of the customer is based on customer travel plans.

5. The method of claim 1, wherein the expected location of the customer is based on a customer location history, wherein the customer location history is based on at least one of a mobile device location history, a credit and/or debit card usage history, an internet browsing history, and a financial terminal use history.

6. The method of claim 1, wherein receiving the second location of the mobile device comprises:
   sending, via the computing device to the mobile device, a request for the mobile device to send the second location of the mobile device to the computing device; and
   receiving, via the computing device from the mobile device, the second location in response to the request for the mobile device to send the second location information.

7. The method of claim 6, wherein the request for the mobile device to send the second location of the mobile device comprises a push notification, wherein the computing device receives the second location of the mobile device from the mobile device in response to the customer indicating to send the second location.

8. The method of claim 1, wherein the authentication information includes at least one of a quick response (QR) code, a barcode, an audio file, an image, an alphanumeric code, a graphic code, and mobile device identification information.

9. The method of claim 1, further comprising:
   receiving, by the computing device and from the financial terminal or the mobile device, the customer answer in response to the authentication challenge.

10. The method of claim 1, further comprising, based on the customer answer not passing the authentication challenge, sending, from the computing device to the financial terminal or the mobile device, instructions for authenticating the financial account request.

11. A computing device comprising:
    a memory; and
    one or more processors in communication with the memory, the one or more processors configured to:
       receive, from a customer device, a request to provision a financial account for a customer;
       verify a first location of a mobile device of the customer associated with the requested financial account being within a predetermined distance of an expected location of the customer;
       receive, from a financial terminal, authentication information, wherein the financial terminal received the authentication information from the mobile device;
       based on a second location of the mobile device not being within a predetermined distance of a location of the financial terminal, send, to the financial terminal or the mobile device, information indicative of an authentication challenge; and
       provision, by the computing device, the financial account based on a customer answer passing the authentication challenge.

12. The computing device of claim 11, wherein the one or more processors are further configured to:
    associate the mobile device with the requested financial account,
    wherein associating the mobile device with the requested financial account is based on the first location of the mobile device being within the predetermined distance of the expected location of the customer.

13. The computing device of claim 11, wherein the one or more processors receive the first location of the mobile device within a first predetermined time from receiving the request to provision the financial account, and wherein the one or more processors receive the second location of the mobile device within a second predetermined time from receiving the authentication information from the financial terminal.

14. The computing device of claim 11, wherein the expected location of the customer is based on at least one of customer travel plans, a mobile device location history, a credit and/or debit card usage history, an internet browsing history, and a financial terminal use history.

15. The computing device of claim 11, wherein the one or more processors are further configured to:
- send, to the mobile device, a request for the mobile device to send the second location of the mobile device to the computing device; and
- receive, from the mobile device, the second location in response to the request for the mobile device to send the second location.

16. The computing device of claim 15, wherein the request for the mobile device to send the second location of the mobile device comprises a push notification, wherein the one or more processors are configured to receive the second location of the mobile device from the mobile device in response to the customer indicating to send the second location.

17. The computing device of claim 11, wherein the authentication information includes at least one of a quick response (QR) code, a barcode, an audio file, an image, an alphanumeric code, a graphic code, and mobile device identification information.

18. The computing device of claim 11, wherein the one or more processors are further configured to:
- receive, from the financial terminal or the mobile device, the customer answer in response to the authentication challenge.

19. The computing device of claim 11, wherein the one or more processors are configured to, based on the customer answer not passing the authentication challenge, send, to the financial terminal or the mobile device, instructions for authenticating the financial account request.

20. A computer readable medium comprising instructions that when executed cause one or more processors to:
- receive, from a customer device, a request to provision a financial account for a customer;
- verify a first location of a mobile device of the customer associated with the requested financial account being within a predetermined distance of an expected location of the customer;
- receive, from a financial terminal, authentication information, wherein the financial terminal received the authentication information from the mobile device;
- based on a second location of the mobile device not being within a predetermined distance of a location of the financial terminal, send, to the financial terminal or the mobile device, information indicative of an authentication challenge; and
- provision the financial account based on a customer answer passing the authentication challenge.

* * * * *